(12) United States Patent
Peuchert et al.

(10) Patent No.: US 7,515,802 B2
(45) Date of Patent: Apr. 7, 2009

(54) GLASS FIBRE WITH AT LEAST TWO GLASS LAYERS

(75) Inventors: Ulrich Peuchert, Bodenheim (DE); Ruediger Sprenhard, Mainz (DE); Martin Letz, Klein-Winterheim (DE); Frank Buellesfeld, Frankfurt (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/489,020

(22) PCT Filed: Sep. 7, 2002

(86) PCT No.: PCT/EP02/10058

§ 371 (c)(1), (2), (4) Date: Aug. 16, 2004

(87) PCT Pub. No.: WO03/022768

PCT Pub. Date: Mar. 20, 2003

(65) Prior Publication Data

US 2004/0252961 A1    Dec. 16, 2004

(30) Foreign Application Priority Data

Sep. 10, 2001  (DE)  ............................... 101 44 475
Mar. 13, 2002  (DE)  ............................... 102 11 247

(51) Int. Cl.
*G02B 6/02* (2006.01)
*G02B 6/036* (2006.01)

(52) U.S. Cl. .................. 385/127; 65/385; 501/66; 501/67

(58) Field of Classification Search ......... 385/122–128; 65/385–412
See application file for complete search history.

(56) References Cited

U.S. PATENT DOCUMENTS 5,037,181 A * 8/1991 Byer et al. ............... 385/144

(Continued)

FOREIGN PATENT DOCUMENTS

EP    1 127 858 A1    8/2001

(Continued)

OTHER PUBLICATIONS

Miller, A. E., Nassau, K., Lyons, B., Lines, M.E., The intensity of Raman scattering in glasses containing heavy metal oxides, 1988, Journal of Non-Crystalline Solids, vol. 99, Issues 2-3, pp. 289-307.*

(Continued)

*Primary Examiner*—Frank G. Font
*Assistant Examiner*—Eric D. Chiem
(74) *Attorney, Agent, or Firm*—Michael J. Striker

(57) ABSTRACT

The glass fiber for an optical amplifier has a matrix glass core, a first glass cladding, and a second glass cladding. The matrix glass core has a composition, in mol %, of $Bi_2O_3$, 30-60; $SiO_2$, 0.5-40; $B_2O_3$, 0.5-40; $Al_2O_3$, 0-30; $Ga_2O_3$, 0-20; $Ge_2O_3$, 0-25; $La_2O_3$, 0-15; $Nb_2O_5$, 0-10; $SnO_2$, 0-30; alkali metal oxides, 0-40; and $Er_2O_3$, 0.05-8. The glass claddings have the same composition as the core, except that a transition metal compound is included as an absorbent. The refraction index of the matrix glass is > about 1.85, the refraction index of the first glass cladding is less than that of the core, and the refraction index of the second glass cladding is higher than that of the first.

15 Claims, 5 Drawing Sheets

U.S. PATENT DOCUMENTS

| | | | |
|---|---|---|---|
| 5,237,576 A | | 8/1993 | DiGiovanni et al. |
| 5,251,062 A | * | 10/1993 | Snitzer et al. ............ 359/341.1 |
| 5,278,850 A | | 1/1994 | Ainslie |
| 5,305,414 A | | 4/1994 | Higby |
| 5,490,010 A | * | 2/1996 | Sharma et al. ............... 359/341 |
| 5,530,709 A | * | 6/1996 | Waarts et al. .................. 372/6 |
| 5,627,848 A | * | 5/1997 | Fermann et al. ............... 372/18 |
| 5,668,659 A | * | 9/1997 | Sakamoto et al. ........ 359/341.5 |
| 5,703,978 A | | 12/1997 | DiGiovanni et al. |
| 5,740,297 A | * | 4/1998 | Onishi et al. ................. 385/127 |
| 5,802,236 A | * | 9/1998 | DiGiovanni et al. ........ 385/127 |
| 5,852,701 A | * | 12/1998 | Kato et al. ................... 385/127 |
| 5,937,134 A | * | 8/1999 | DiGiovanni ................. 385/142 |
| 6,055,353 A | | 4/2000 | Aiso |
| 6,297,179 B1 | * | 10/2001 | Beall et al. ...................... 501/5 |
| 6,653,251 B2 | | 11/2003 | Sugimoto et al. |
| 6,694,079 B1 | * | 2/2004 | Matsuo et al. ............... 585/123 |
| 2003/0064878 A1 | | 4/2003 | Sugimoto et al. |

FOREIGN PATENT DOCUMENTS

| | | |
|---|---|---|
| JP | 63-121807 | 5/1988 |
| JP | 63-236728 | 10/1988 |
| JP | 5-61079 | 3/1993 |
| JP | 6-21536 | 1/1994 |
| JP | 6-342175 | 12/1994 |
| JP | 7-15059 | 1/1995 |
| JP | 7-128558 | 5/1995 |
| JP | 9-145941 | 6/1997 |
| JP | 9-205239 | 8/1997 |
| JP | 9-218318 | 8/1997 |
| JP | 10-339819 | 12/1998 |
| JP | 11274613 | 10/1999 |
| JP | 2000-272933 | 10/2000 |
| JP | 2001-139338 | 5/2001 |
| JP | 2001-185789 | 7/2001 |
| WO | 99/51537 | 10/1999 |
| WO | 00/68158 | 11/2000 |
| WO | 01/44837 | 6/2001 |
| WO | 01-55041 | 8/2001 |

OTHER PUBLICATIONS

John H. Duffusi "Heavy Metals—A Meaningless Term", Chemistry International, vol. 23, No. 6, Nov. 2001.

K. Itoh et al: "PR +Doped INF3/GAF3 Based Fluoride Glass Fibers and . . . " Journal of Non-Crystalline Solids 256 & 257, 1999, pp. 1-5.

* cited by examiner

Figures

GLASS FIBRE WITH AT LEAST TWO GLASS LAYERS

BACKGROUND OF THE INVENTION

The present invention relates to a glass fiber which comprises a core, the matrix glass of which contains at least one heavy metal oxide and at least one rare earth compound, the core being surrounded by at least two glass claddings. Furthermore, the present invention relates to a process for producing a glass fiber according to the invention, to an optical amplifier which comprises at least one glass fiber according to the invention, and to the use of the glass fiber according to the invention.

Optical amplifiers are one of the most important key components of optical communication technology. If a purely optical telecommunications signal is transmitted in a glass fiber, it is inevitable that intrinsic signal attenuation will occur. To compensate for this attenuation, it is necessary to use highly efficient optical amplifiers which are able to amplify a signal without the optical signal having to be converted into an electronic signal and then back into an optical signal. Optical amplifiers can also increase the speed of amplification, and the deterioration in the signal/noise ratio is significantly lower on account of the elimination of the conversion into electronic signals and back.

In this context, the technical demands imposed on optical amplifiers are increasing in particular on account of the continuously rising demand for ever greater bandwidths. Currently, broadband data transmission is realized using WDM (WDM "wavelength division multiplexing") technology. Most amplifiers of the prior art operate in the C band (approx. 1528 nm to 1560 nm) and have only a limited broadband capacity, since optical amplifiers of this type have hitherto been based on $Er^{3+}$-doped $SiO_2$ glasses. Therefore, the demand for greater bandwidths has required the development of multicomponent glasses, for example heavy metal oxide glasses (HMO glasses). As manifested by their intrinsically very high refractive index (at 1.3 µm) of n>approx. 1.85, heavy metal oxide glasses have high internal electrical fields and therefore, on account of greater Stark splitting, lead to broad-band emission from the rare earth ions. However, the high refractive index of HMO glasses also leads to new problems which have to be overcome.

Various mechanisms in optical amplifier fibers can give rise to scattered light, which can lead to a deterioration in the signal/noise ratio and should therefore be removed or avoided as fully as possible.

In amplifier fibers based on $SiO_2$, scattered light is removed by a polymer coating applied to the glass fiber. Since absorbent polymer coatings with a refractive index of n≧1.4 are available, it is readily possible for noise which is caused by reflected signals and/or scattered light from outside the fiber to be absorbed by a polymer coating of this type on the $SiO_2$ glass fiber.

Heavy metal oxide glasses which are suitable for use as fiber amplifiers usually have a refractive index of approximately n=1.9. Polymer coatings which have hitherto been available have always had a lower refractive index than heavy metal oxide glasses. Therefore, coating with polymers of this type for absorption of scattered light causes problems, since it is only possible to provide a polymer cladding with a lower refractive index. Any coating with a cladding made from a material with a lower refractive index then leads to strong, undesired reflection at the interface between this material and the core regions or an inner cladding.

Furthermore, in conventional $SiO_2$ amplifier fibers, there is substantially no change in refractive index at a contact location between a standard telecommunications fiber and a glass fiber of an optical amplifier, and consequently the reflection which occurs at the transition from an $SiO_2$ glass fiber amplifier to a standard communications glass fiber is negligible.

By contrast, the high refractive index of HMO fibers means that any contact location with a standard $SiO_2$ telecommunications glass fiber leads to strong reflection at the interface between $SiO_2$ standard fiber and heavy metal oxide glass fiber of the optical amplifier. Since an optical amplifier is at both outputs connected to $SiO_2$ telecommunications glass fibers or transition fibers based on $SiO_2$ with a high numerical aperture, there is a considerable tendency for a laser resonator with standing lightwaves to form in the optical amplifier. To prevent the latter phenomenon, it is recommended for the contact locations in relation to the glass fibers to be designed at a defined or finite angle. However, this in turn leads to considerable or significant reflection which is scattered into the cladding of the fiber. Therefore, scattered light which migrates through the cladding of the fiber is reflected back and forth and it is impossible to prevent scattered light from reaching the central core region and penetrating into the latter. This scattered light will influence the inversion of the state of the rare earth ions and leads to amplification of the noise and a drop in the signal power(s) of the amplifier.

Outer, absorbent claddings for various glass systems are known from the prior art (for example K. Itoh et al., J. Non-Cryst. Sol, 256-257, 1 (1999)).

EP 1 127 858 describes a light-amplifying glass, the matrix glass of which is doped with 0.01 to 10 mol % of Er, with the matrix glass necessarily containing 20 to 80 mol % of $Bi_2O_3$, 0.01 to 10 mol % of $CeO_2$, and at least one of $B_2O_3$ or $SiO_2$. However, the glass fibers described in this document are only provided with standard polymer coatings. The same is true of the glasses with a high antimony oxide content described in WO 99/51537.

JP 11274613 A describes a glass fiber comprising glasses with a high refractive index, which has two glass claddings. According to this document, 10 000 ppm of absorbent material are required. However, such high levels of absorbent material influence the properties of the glass and are therefore disadvantageous.

SUMMARY OF THE INVENTION

Therefore, the object of the present invention was to provide a glass fiber comprising a matrix glass with at least one heavy metal oxide, for an optical amplifier, which allows the problems of the prior art described above to be avoided. In particular, this glass fiber should allow the noise caused by scattered light to be minimized and therefore the signal power of the amplifier to be increased.

This object is achieved by the embodiments of the present invention which are described in the claims.

In particular, the present invention relates to a glass fiber comprising a core, the matrix glass of which contains at least one heavy metal oxide and at least one rare earth compound, the core being surrounded by at least two glass claddings, and the matrix glass having a refractive index of greater than about 1.85, the change in the refractive index Δn from the core to the first cladding being in the range from 0.001 to 0.08, and the first cladding having a lower refractive index than the core.

BRIEF DESCRIPTION OF THE DRAWING

IN THE DRAWING

Figure 1:
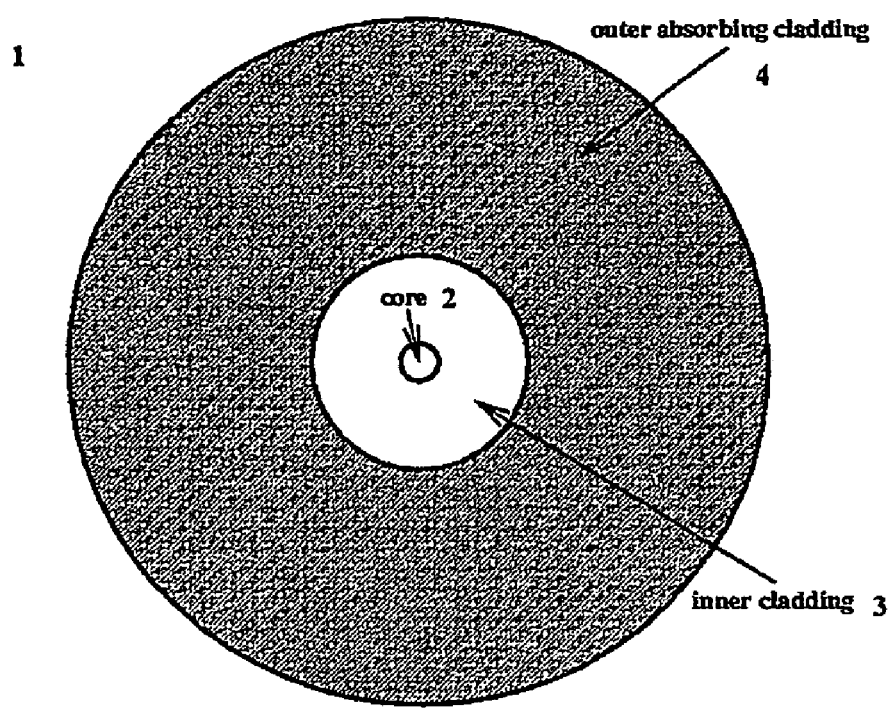

FIG. 1 shows a diagrammatic cross section through a particularly preferred embodiment of the glass fiber according to the invention.

Figure 2:
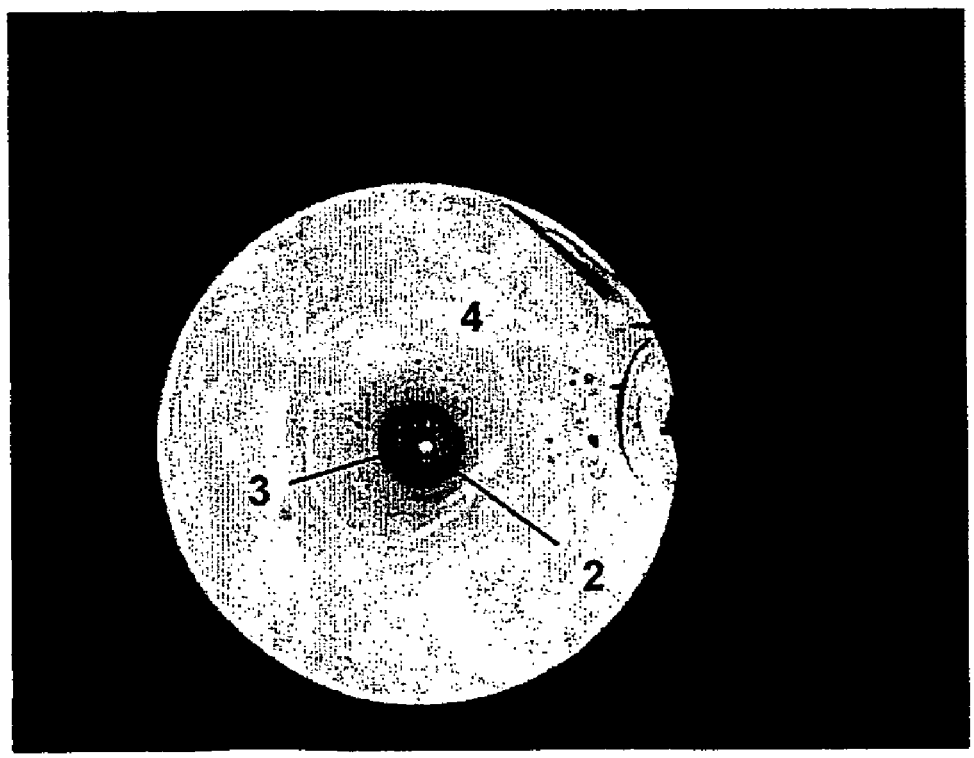
Figure 5:
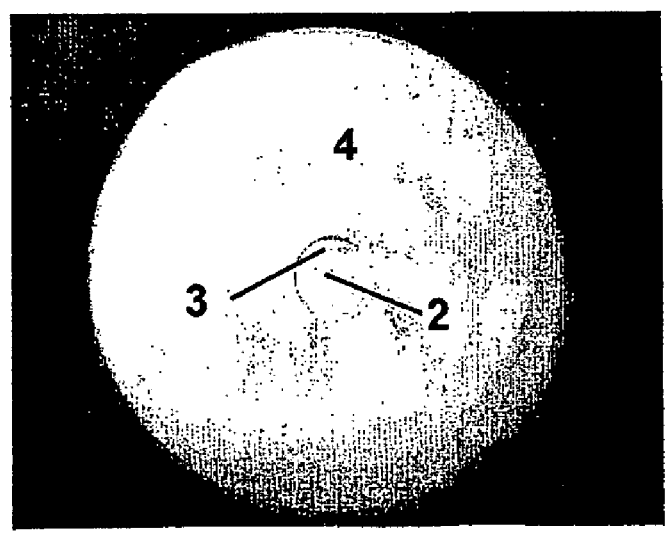
Figure 7:
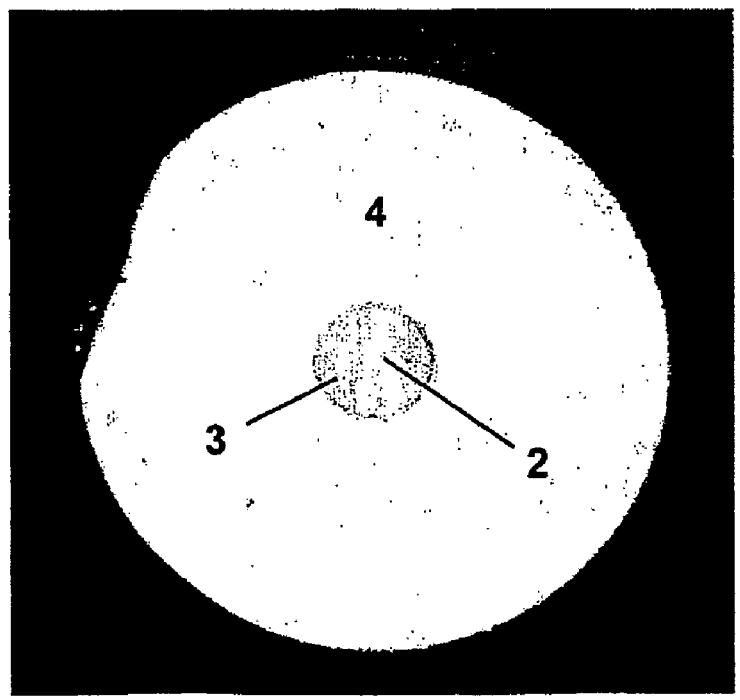

FIGS. 2, 5 and 7 show photographic images of the cross section through glass fibers according to the invention with two glass claddings.

Figure 3:
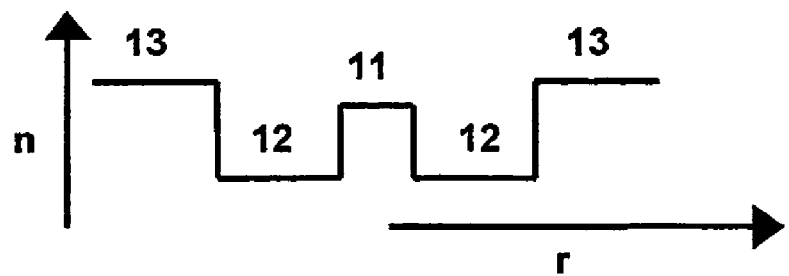
Figure 4:
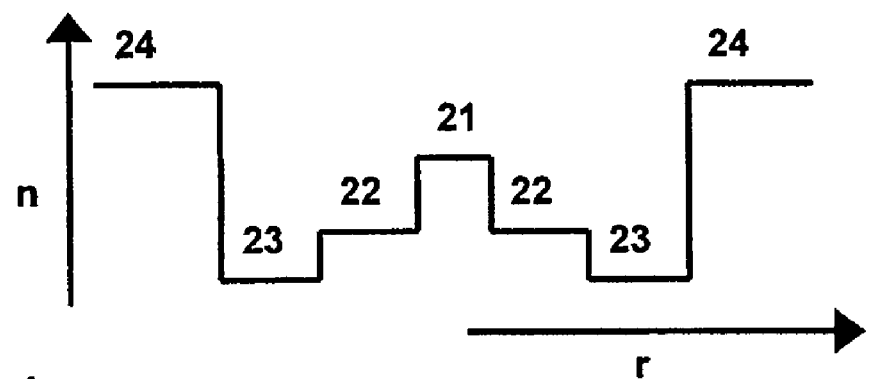

FIGS. 3 and 4 diagrammatically depict preferred designs of double-clad fibers according to the invention with two or three claddings.

Figure 6:
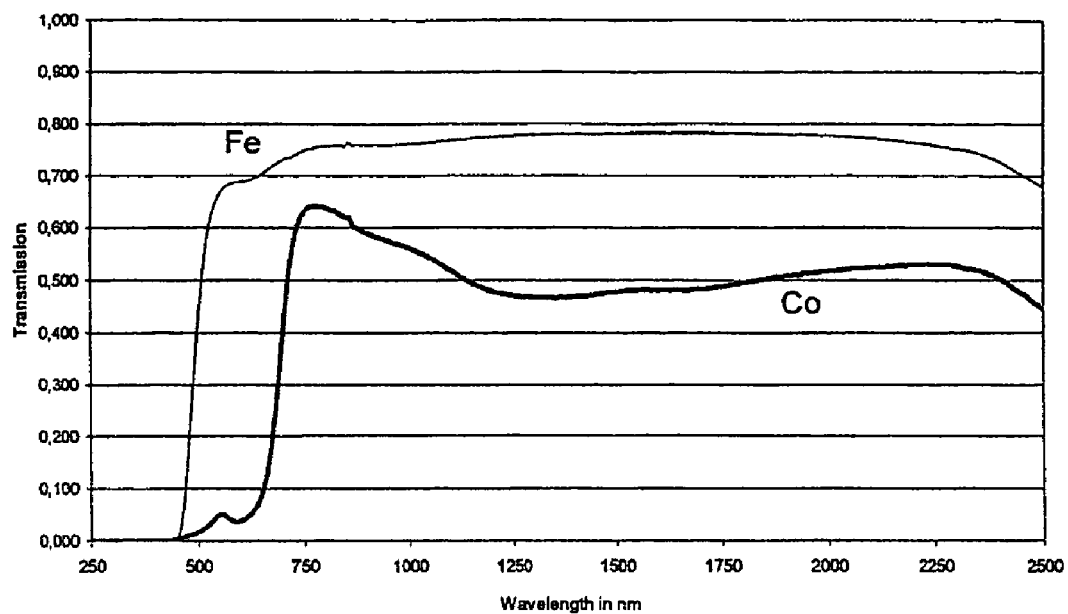

FIG. 6 shows a comparison of the absorbing action of iron oxide and cobalt oxide as absorbing material in a bismuth oxide-containing glass which has been melted under strongly oxidizing conditions.

Figure 8A:
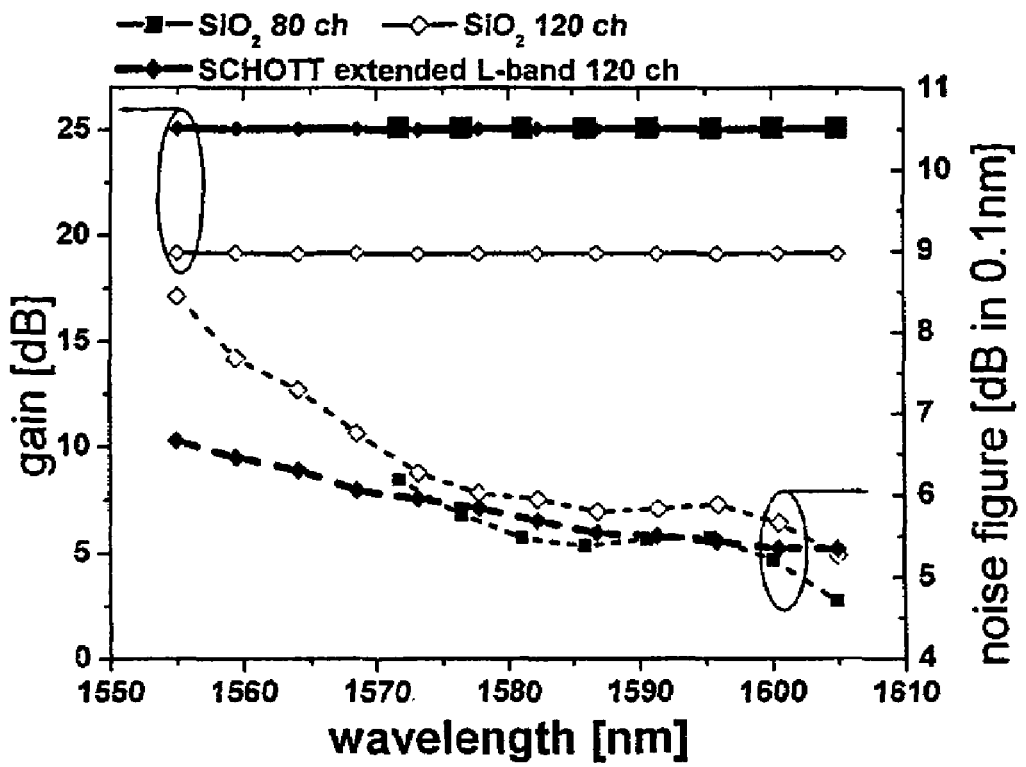
Figure 8B:
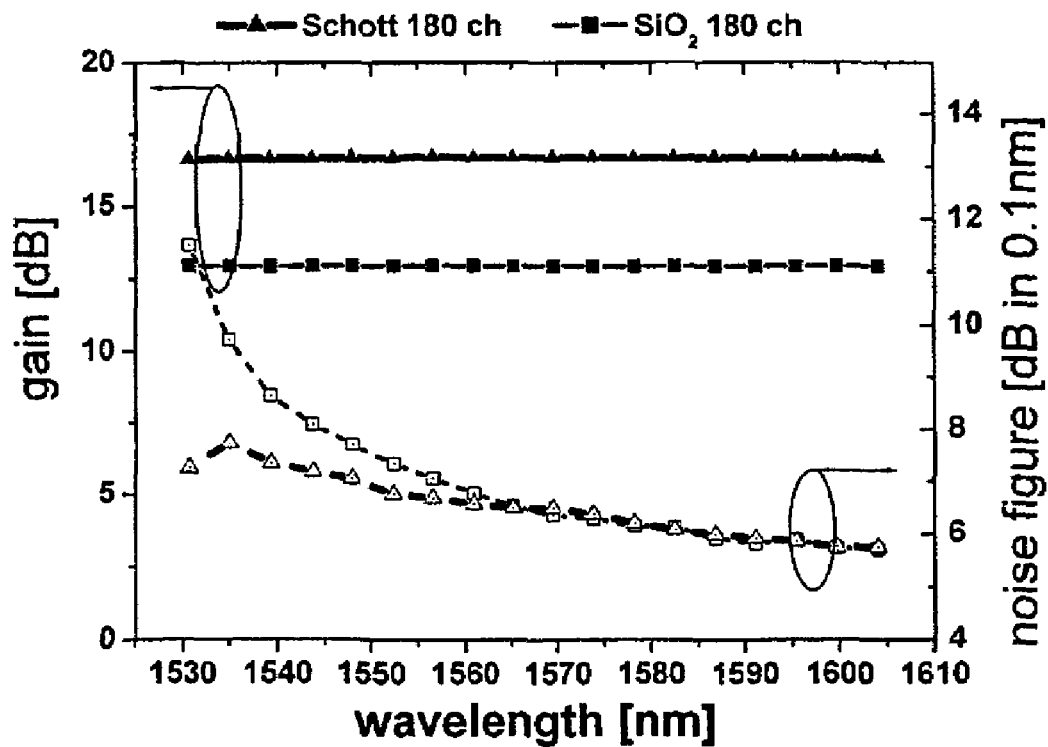

FIGS. 8a and 8b show the maximum gain, calculated from Giles parameters, for a fixed number of channels as a function of the wavelength, as well as the change in the noise as a function of the wavelength.

Figure 9A:
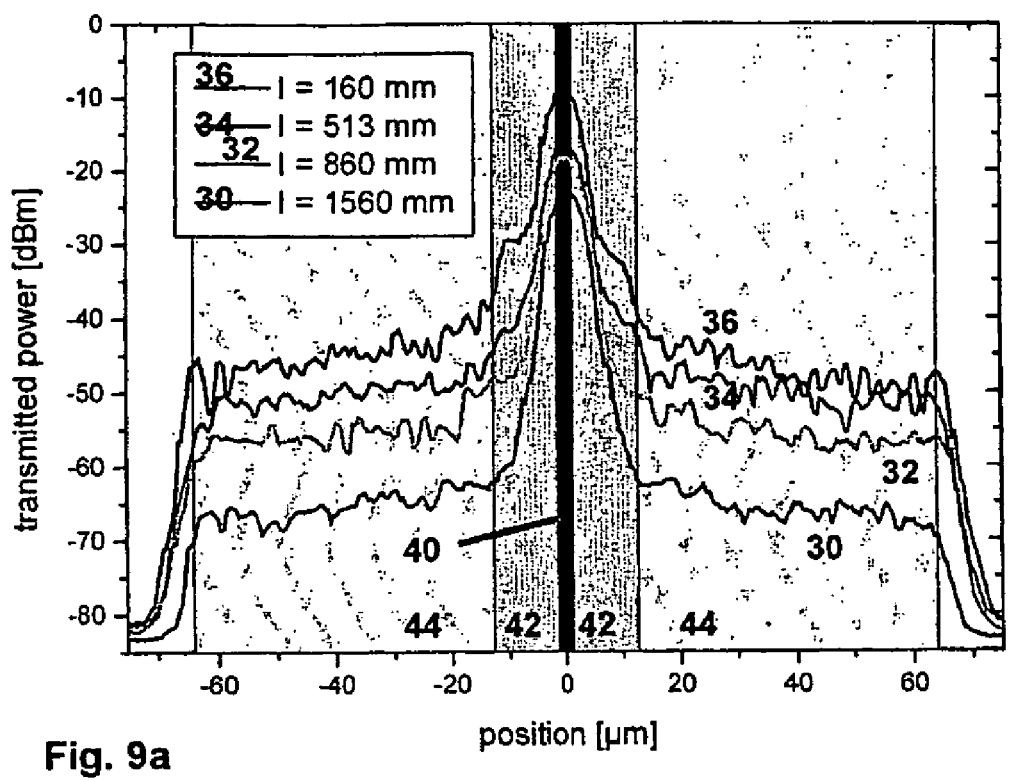
Figure 9B:
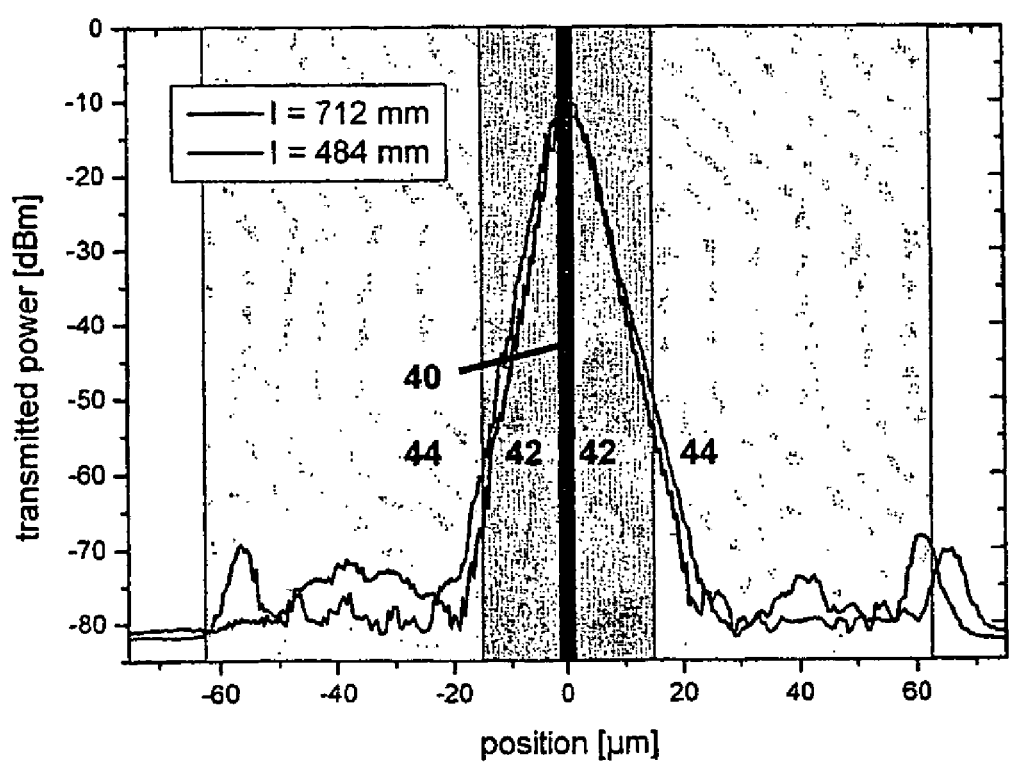

FIGS. 9a and 9b show the energy which is transmitted in each case in the core region, in the region of the first cladding and in the region of the second cladding, for various fiber lengths as a function of the doping of the outer cladding.

DETAILED DESCRIPTION OF THE INVENTION

It is preferable for the core of the glass fiber according to the invention to contain at least one heavy metal oxide which is selected from oxides of Bi, Te, Se, Sb, Pb, Cd, Ga, As and/or mixed oxides and/or mixtures thereof. The matrix glass of the core particularly preferably contains heavy metal oxides which are selected from oxides of Bi, Te, Sb and/or mixtures thereof.

Furthermore, the matrix glass of the core comprises at least one dopant which can be excited by light. According to the invention, the matrix glass of the core contains rare earth ions as dopant. In this context, a dopant is to be understood as meaning a component which is only added to the glass in small quantities and which therefore has very little influence on most of the physical properties of the glass, such as Tg, the refractive index or the softening point. However, a dopant of this type may have a significant influence on certain properties, in particular optical properties, such as for example the capacity for optical stimulation.

It is preferable for the matrix glass of the core to comprise at least one rare earth compound which is selected from compounds of Ce, Pr, Nd, Pm, Sm, Eu, Gd, Tb, Dy, Ho, Er, Tm, Yb and/or Lu. Oxides of the elements Er, Pr, Tm, Nd and/or Dy are particularly preferred, and oxides of Er are most preferred.

If appropriate, it is also possible for Sc and/or Y compounds to be present in the glass according to the invention in addition to one or more rare earth compound(s).

The rare earth compounds used as dopants are preferably what are known as "optically active compounds"; the term "optically active compounds" is to be understood in particular as meaning compounds which lead to the glass according to the invention being capable of stimulated emission when the glass is excited by a suitable pumping source.

It is also possible for at least two rare earth compounds to be used, in a total quantity of from 0.01 to 15 mol %. Glasses containing optically active rare earth ions can be co-doped with optically inactive rare earth elements in order, for example, to increase the emission lifespans. For example, Er can be co-doped with La and/or Y. To increase the pumping efficiency of the amplifier, it is also possible, for example, for Er to be co-doped with further optically active rare earth compounds, such as for example Yb. Co-doping with Gd may also be effected in order to provide stability against crystallization.

Doping with other rare earth ions, such as for example Tm, makes it possible to open up other wavelength regions, for example, in the case of Tm, what is known as the S band between 1420 and 1520 nm.

Furthermore, to make more effective use of the excitation light, it is possible to add sensitizers, such as Yb, Ho and Nd in a suitable quantity, for example 0.005 to 8 mol %.

The level of each individual rare earth compound is, for example, from 0.005 to 8 mol %, preferably 0.05 to 5 mol %, based on oxide.

According to one embodiment, the matrix glass comprises both Ce and Er.

According to a further embodiment, the matrix glass contains no cerium.

According to a preferred embodiment of the present invention, the glass fiber according to the invention contains at least one $Bi_2O_3$ glass in the core and/or in one or more claddings. The following compositions are particularly preferred:

| Component | Preferred components and ranges [mol %] | Particularly preferred components and ranges [mol %] |
|---|---|---|
| $Bi_2O_3$ | 10-80 | 30-60 |
| $SiO_2$ | 0-60 | 0.5-40 |
| $B_2O_3$ | 0-60 | 0.5-40 |
| $Al_2O_3$ | 0-50 | 0-30 |
| $Ga_2O_3$ | 0-50 | 0-20 |
| $GeO_2$ | 0-30 | 0-25 |
| $In_2O_3$ | 0-30 | |
| $WO_3$ | 0-30 | |
| $MoO_3$ | 0-30 | |
| $La_2O_3$ | 0-30 | 0-15 |
| $Nb_2O_5$ | 0-30 | 0-10 |
| $Ta_2O_5$ | 0-15 | |
| $ZrO_2$ | 0-30 | |
| $TiO_2$ | 0-30 | |
| $SnO_2$ | 0-40 | 0-30 |
| $M^I_2O$ | 0-40 | 0-40 |
| $M^{II}O$ | 0-30 | |
| F and/or Cl | 0-10 | |
| Rare earths | 0.005-8 (based on oxide) | 0.05-5 (based on oxide) |

In the above table, $M^I$ is at least one of Li, Na, K, Rb and Cs and $M^{II}$ is at least one of Be, Mg, Ca, Sr, Ba and/or Zn. It is particularly preferable to use Li and/or Na as $M^I$.

FIGS. 8a and 8b show the gain and the noise of a doped HMO double-cladding fiber in accordance with the invention compared to $SiO_2$ amplifier fibers as a function of the wavelength and the number of channels. To produce these diagrams, methods which are known from the prior art are used to determine the so-called Giles parameters for the amplifier fibers, and the maximum gain and the noise at a defined wavelength are then determined from the Giles parameters for a defined channel number. It can be seen from FIG. 8a firstly that with a set number of 120 channels [ch], a maximum gain of approx. 25 dB is achieved with an amplifier fiber according to the invention, while with the same number of channels only a maximum gain of just below 20 dD is achieved for a silicate-based amplifier fiber. To achieve a similar gain of 25 dD with a silicate-based amplifier fiber, the number of channels has to be reduced from 120 to 80 channels. At the same time, with the same number of channels the noise for the glass fiber according to the invention is significantly lower than the noise for a silicate-based fiber. The same picture emerges even with a further increase to 180 channels (FIG. 8b): the fiber according to the invention has a higher maximum gain with a lower noise. These FIGS. 8a and 8b show that broader-band transmission at low noise is possible with the HMO glass fiber according to the invention.

The glass fiber according to the invention, in addition to the core, also comprises at least two glass claddings which surround the core.

The cladding glasses are not subject to any particular restriction. They preferably have similar physical properties to the matrix glass of the core and/or the glass of the other claddings, in particular a similar refractive index, a similar Tg and a similar softening point. It is preferable for the claddings to comprise substantially the same composition as the core, but with the compositions being modified in such a way that the required shifts in refractive index from the core to the first cladding and if appropriate from one cladding to a further cladding are fulfilled. Furthermore, the optical properties of the core and cladding glasses preferably differ. It is also preferable for the various cladding glasses to have different optical properties.

According to the invention, the term "first cladding" is to be understood as meaning the cladding which surrounds the core. The claddings are numbered in ascending order from the first cladding outward.

According to the invention, the refractive indices mentioned are in each case the refractive indices of the glasses for electromagnetic radiation in the near IR region, in particular at approximately 1300 nm. The change in refractive index Δn from the core to the first cladding is from 0.001 to 0.08, particularly preferably from 0.003 to 0.04, even more preferably from 0.005 to 0.05, with the first cladding having a lower refractive index than the core. The ratio of the refractive index of the various claddings with respect to one another can be set as required using methods which are known from the prior art. To set a refractive index which is slightly higher than in the comparative glass, for example, a proportion of at least one component with a lower refractive index is swapped for at least one component with a higher refractive index.

According to a first embodiment, the refractive index $n_{m2}$ of the second cladding is substantially equal to or preferably higher than the refractive index $n_{m1}$ of the first cladding. According to other embodiments, however, it is also possible for the refractive index of the second cladding to be lower than that of the first cladding and for a third cladding, which has a higher refractive index than the second cladding, to be added. Particularly preferred embodiments will be dealt with in more detail below.

According to a first embodiment, the glass of the claddings also does not contain any rare earth doping, in particular any doping with optically active rare earth compounds. According to this embodiment, the amplification and guidance of the light mode(s) preferably take place in the core.

According to another embodiment, however, the glass of the first cladding contains small quantities of the rare earth compound(s) used as doping in the core. It is preferable for the first cladding to be doped with up to half the amount, particularly preferably up to a third of the amount, used in the core. Surprisingly, it has emerged that this measure makes it possible to improve the signal/noise ratio of an amplifier fiber and that in this way it is also possible to improve the coupling of the amplifier fibers to $SiO_2$ fibers. It is assumed that with large core radii, a more effective overlap between the signal mode and the pump mode is effected with the rare earth ions in the cladding as well.

According to a preferred embodiment of the present invention, the glass of at least one cladding, in particular of the outermost cladding, contains at least one absorbent component or an absorbent material. Absorbent components of this type which may be used include transition metal compounds, for example compounds of iron (in particular $Fe^{2+}$ and $Fe^{3+}$), nickel (in particular $Ni^{2+}$), cobalt (in particular $Co^{2+}$), manganese (in particular $Mn^{2+}$), copper (in particular $Cu^+$ and $Cu^{2+}$), vanadium (in particular $V^{3+}$ and $V^{4+}$), titanium (in particular $Ti^{3+}$) and/or chromium (in particular $Cr^{3+}$), and/or rare earth compounds. By way of example, the doping with $Fe^{2+}$ may amount to several 100 ppm (based on the weight ratio). The composition of the second cladding may otherwise correspond to that of the core glass.

The level of absorbent material to be added depends on the absorptance of the absorbent material. Levels of 5 ppm, preferably 10 ppm, may even be sufficient, for example in the case of $Co^{2+}$. It is preferable for the amount added to be at most 5000 ppm, more preferably 2000 ppm, most preferably at most 1000 ppm. If greater quantities of absorbent material are added to the glass composition, the properties of the glass, such as the crystallization properties, may be adversely affected. This is therefore not preferred.

It has been established that with certain glass compositions iron oxides are unsuitable absorbent materials. It has been found that in particular bismuth oxide in the molten state may be reduced to form elemental bismuth, which leads to the precipitation of black metallic Bi and therefore to a deterioration in the optical properties of the glass. Therefore, glasses which contain polyvalent heavy metal oxides, such as bismuth oxide, are preferably melted under strongly oxidizing conditions. If the glasses according to the invention are used as optical amplifiers for the 1.5 µm band, known as the C band, their absorption band in the near infrared region could allow $Fe^{2+}$ ions to serve as suitable absorbers. However, experiments have shown that 99% of the $Fe^{2+}$ ions added were oxidized to form $Fe^{3+}$ ions by the oxidizing melting conditions. Since the absorption band of $Fe^{3+}$ is not in the required range, iron oxide cannot act as absorbent material in glasses produced in this manner.

It has been found that $Co^{2+}$ ions, which likewise have a suitable absorption in the near infrared region, are surprisingly not converted into a higher oxidation state even by relatively strongly oxidizing conditions in the melt and are therefore particularly suitable for use as absorbent material in glass of this type. Therefore, it is preferable for the outermost cladding to contain at least one preferably oxidic divalent cobalt compound as absorbent material.

FIG. 6 compares the transmission spectrum of a bismuth oxide glass containing iron oxide with that of a $Co^{2+}$-containing glass. Although iron has been added in the form of divalent iron (added in a quantity of 1000 ppm) to the starting batch, the transmission of the glass in the region of 1500 nm is scarcely adversely affected. The absorbent action is therefore low. By contrast, the transmission of a glass which contains just 250 ppm of $Co^{2+}$ in oxidic form has dropped to less than 50% in particular in the region of 1500 nm. Therefore, cobalt oxide has an excellent absorbent action compared to iron oxide in these glasses.

FIGS. 9a and 9b show the energy transmitted in each case in the core 40 and the claddings 42 and 44 for two types of glass fibers according to the invention. FIG. 9a shows the energy transmitted in a fiber according to the invention whose outer cladding 44 is doped with iron as oxidizing material.

The various curves 30 to 36 correspond to different fiber lengths. FIG. 9a shows that with longer fiber lengths the energy transmitted in the second cladding 44 decreases in relation to the energy transmitted in the core 40 and first cladding 42. FIG. 9b shows the corresponding energy transmission as a function of the radius of a glass fiber whose outer cladding 44 is doped with cobalt. The absorption effect of the second cladding is significantly less effective in this case. Scarcely any energy is transmitted in the outer cladding. The absorption effect is in this case independent of the fiber length.

FIGS. 3 and 4 show two particularly preferred designs of a glass fiber according to the invention in schematic form. These figures diagrammatically depict the refractive index as a function of the radius of the glass fiber.

According to a preferred embodiment of the present invention, the core of the glass fiber according to the invention is surrounded by precisely two glass claddings.

FIG. 1 shows a sectional view through a preferred embodiment of the glass fiber 1 according to the invention. The core 2 is surrounded by an inner cladding 3, which is in turn surrounded by an outer cladding 4. According to this embodiment, the outer cladding also contains an absorbent material as described above.

FIG. 3 shows a particularly preferred design of the refractive indices of a double-clad fiber. The region 11 is the core of the fiber, which is generally located approximately in the center of the fiber and is doped with at least one rare earth compound, the region 12 is the inner cladding and has a lower refractive index than the core region 11, so that it is ensured that the light propagating in the region of the core is guided. The region 13 represents the second and in this case outer cladding, which is primarily intended to absorb scattered light. As shown here, the refractive index of the second cladding may be higher than the refractive index of the core, but it is also possible for the second cladding to have the same refractive index as the core or a lower refractive index than the core. In general, an outermost cladding of this type has a higher refractive index than the inner cladding which adjoins it.

According to a further embodiment of the present invention, the core of the glass fiber according to the invention is surrounded by precisely three glass claddings.

FIG. 4 shows a particularly preferred design of a glass fiber according to the invention with three glass claddings. The region 21 represents the core of the fiber, which is generally located in the center of the glass fiber, is doped with, for example, $Er^{3+}$ and guides the signal mode. The inner cladding 22 may be doped with $Yb^{3+}$. Doping of the first cladding with, for example, $Yb^{3+}$ in this way allows the fiber to be used for what is known as multimode pumping. Whereas in the case of single-mode pumping light is radiated only into the core region of the amplifier fiber, and only very small lasers, which are therefore very expensive, can be used for this purpose, in the case of multimode pumping, light is radiated into the wider cross-sectional region of core and, in addition, the first cladding. This radiation of light causes $Yb^{3+}$ to be excited at approx. 975 nm ($^2F_{7/2} \rightarrow {}^2F_{5/2}$). Since $Yb^{3+}$ is fluorescent at a similar wavelength, this fluorescence pumps the $^4I_{11/2}$ level of the $Er^{3+}$ ion at approx. 980 nm. The light sources which can be used for multimode pumping are significantly less expensive. The region of the second cladding 23, which has a lower refractive index than the first cladding, adjoining the first cladding 22 is responsible for guiding the light which propagates in the region of the first cladding 22, and the region of the third cladding 24 in turn serves as an outer absorbent cladding.

The glass fiber according to the invention is preferably substantially circular in cross section. However, the present invention also encompasses glass fibers which have a cross section which differs from a circular cross section.

The core of the glass fiber according to the invention generally lies in the center of the glass fiber according to the invention, with the claddings preferably arranged coaxially around the core. However, the present invention also encompasses embodiments in which the core does not lie in the center of the glass fiber.

Furthermore, it is preferable for the glass fiber according to the invention to comprise precisely one core. However, according to other embodiments it is also possible for the glass fiber according to the invention to include a plurality of core fibers.

The glass fiber according to the invention preferably has an overall thickness of 100 to 400 µm, more preferably 100 to 200 µm. An overall thickness of approximately 125 µm is particularly preferred.

For use as an optical amplifier fiber, the core of the glass fiber according to the invention preferably has a diameter of from 1 to 15 µm. The thickness $d_{m1}$ of the first cladding is preferably in the range from 5 to 100 µm. The thickness $d_{m2}$ of the second and further claddings is preferably in the range from 10 to 150 µm.

However, for other applications it is also possible for the core and/or claddings to be of any other desired thickness.

According to the invention, the term "core of a glass fiber" is to be understood as meaning the region which has been produced by the glass technology process and thereby differs from the cladding. By contrast, a "core region" encompasses the region in which the intensity of the optical signal has dropped to the $e^{th}$ part of the input intensity.

According to a further embodiment of the present invention, the glass fiber according to the invention comprises, on the outermost glass cladding, at least one coating, which comprises at least one plastic or polymer. This outer plastic coating is used in particular to mechanically protect the glass fiber. The thickness of this plastic coating is preferably from 2 to 400 µm. A coating thickness of less than 2 µm cannot generally provide sufficient protection to the glass fiber. It is particularly preferable for the thickness to be at least 3 µm, more preferably at least 8 µm. With thicknesses of over 400 µm, it becomes difficult to provide a uniform coating. The thickness is particularly preferably at most 70 µm.

Any type of polymer can be used for a plastic coating of this type, so long as it bonds securely to the cladding glass. Examples of plastics of this type include heat-curable silicone resins, UV-curable silicone resins, acrylic resins, epoxy resins, polyurethane resins and polyimide resins, as well as mixtures and/or blends thereof.

Furthermore, the present invention relates to a process for producing the glass fiber according to the invention, in which at least two cladding glasses are formed around a core glass. This can be produced by production processes such as for example a "rod-in-tube" process, a multiple crucible process and extrusion processes, as well as combinations of these processes.

According to one embodiment, first of all a "preform" comprising core and one or more claddings, is produced, this preform already having the layer structure of the subsequent glass fiber; it can be drawn out to form a glass fiber. The thickness of a preform of this type is, for example, from 4 to 30 mm, and its length is from 5 to 40 cm. This preform is drawn out to form a fiber at a suitable temperature.

In the case of a "rod-in-tube" process, a hole is drilled into a cladding glass which is in the form of a strand or rod, so that a tubular cladding glass is obtained. A matching rod of the core glass is introduced into this tubular cladding glass. Furthermore, the cladding glass can also be drawn out as a tube by means of suitable shaping processes. By way of example, a rod of a core glass with a diameter of from 1.0 to 1.4 mm is introduced into a tubular first cladding with a diameter of the internal hole of 1.5 mm and an external diameter of 7 mm. To obtain a core surrounded with more than one cladding, it is possible for this method to be repeated a number of times, i.e. for a second cladding a hole is drilled into a second cladding glass in rod form, and the preform comprising core and first cladding is introduced into the tubular second cladding. To join the interfaces, this arrangement of core and claddings is heated, preferably to above the transformation temperature, in order to obtain a "preform". If appropriate, a preform comprising core and at least a first cladding, after it has been heated in this manner, can be drawn out to a certain extent and introduced in this drawn-out form, as a rod, into a second or further cladding. In the rod-in-tube process, it is also possible for a hot-formed, drawn-out rod to be fitted into a hot-formed, drawn tube.

Furthermore, a preform of this type can also be produced by what is known as an extrusion process. In this case, a block of the core glass is placed onto a block of a cladding glass and is then heated linearly from below. Along the heated line, the core glass slowly sinks into the cladding glass until it is completely surrounded by the latter.

In the case of a multiple crucible process, such as a double or triple crucible process, a "preform" comprising a core or one or more claddings is produced directly from the melt using nested crucibles.

According to a further embodiment of the process according to the invention, it is also possible for a glass fiber with a diameter of, for example, 125 µm to be produced directly, i.e. without prior production of a preform. Triple of multiple crucible processes are used in particular for direct fiber production.

These processes for producing a preform can be combined with one another in order to obtain the glass fibers according to the invention with at least two claddings.

According to the present invention, it is particularly preferred for a double crucible process to be used to produce a "preform" comprising the core and the first cladding, and for the preform obtained in this way, comprising core and one cladding, to be introduced as a rod into a tubular second cladding using a "rod-in-tube" process. It has emerged that this combination on the one hand makes it possible to obtain a particularly good interface between core and first cladding, and on the other hand allows a second and/or further cladding to be added in an economic way.

Furthermore, the present invention relates to an optical amplifier which comprises at least one glass fiber according to the invention. By way of example, the optical amplifier has the following structure. The incoming light signal is connected to a coupler via an optical insulator for suppressing light reflections. Signal and pumping light are combined in the coupler and are together introduced into the optically active fiber. The other end of the amplifier fiber is connected to the outgoing fiber. It is also possible for a filter, if appropriate with a further optical insulator, to be arranged here. Furthermore, it is possible for the amplifier fibers to be pumped in both directions, in which case a second coupler is required.

The signal light source is connected at the wave-mixing optical coupler through the optical insulator. Furthermore, the optical coupler is connected to the excitation light source. Then, the optical coupler is connected to an end of the glass fiber. The other end of the optical glass fiber is connected to the optical insulator through the optical coupler for wave splitting. Each part is connected to the optical fiber.

Furthermore, the present invention comprises the use of the glass fiber according to the invention as optically active glass in a laser arrangement.

The present invention is explained in more detail below by means of examples. However, it is not restricted to these examples.

EXAMPLES

Example 1

Glass compositions were produced for the core, the first cladding and the second cladding. Table 1 shows the compositions of the glasses in mol %.

The core glass which had been drawn out into a strand (length 10 cm, diameter 1 mm) was sheathed with the first cladding (external diameter 7 mm; internal hole diameter 1.5 mm) by means of the rod-in-tube process. The preform comprising core and first cladding was then drawn out to a diameter of 1 mm and sheathed with the outer cladding (external diameter 7 mm; internal hole diameter 1.5 mm) by means of a further rod-in-tube step.

TABLE 1

|  | Core | First cladding | Second cladding |
|---|---|---|---|
| $SiO_2$ | 14.3 | 14.3 | 14.4 |
| $B_2O_3$ | 28.5 | 28.5 | 21.4 |
| $Bi_2O_3$ | 42.4 | 42.8 | 50.0 |
| $Al_2O_3$ | 7.2 | 10.7 | 14.1 |
| $Ga_2O_3$ | 7.2 | 3.7 | — |
| $Er_2O_3$ | 0.4 | — | — |
| $Fe_2O_3$ | — | — | 0.1 |
| $n_{1300}$[1)] | 1.9931 | 1.984 | 2.047 |

Note:
[1)]Refractive index at the wavelength of 1300 nm, measured using total reflection method on plane-parallel plates of 5 mm.

The preform obtained was drawn out to form a glass fiber with a thickness of 125 µm.

FIG. 2 shows a photographic image of a cross section through a glass fiber according to the invention. Core 2 is surrounded by the first cladding 3, which is in turn surrounded by the outer cladding 4.

Example 2

The same compositions as in Example 1 were used to produce a double-clad fiber; in this case, the core was sheathed with the first cladding by means of a double crucible process. The core diameter and the dimensions of the first cladding in this case corresponded to those of Example 1. Then, the preform obtained in this way, comprising core and first cladding, was drawn out to a thickness of 1.5 mm. Then, the second cladding was formed around the drawn-out preform comprising core and first cladding by means of the rod-in-tube process.

The preform obtained was drawn out to form a glass fiber with a thickness of 125 µm.

Optical examination revealed that in Example 2 a better interface was obtained between core and first cladding. FIG. 7 shows a photographic image of the cross section through a fiber obtained in accordance with Example 2.

Example 3

The process described in Example 1 was used to produce a double-clad fiber with core and cladding glasses based on tellurium oxide.

The preform obtained was drawn out to form a glass fiber with a thickness 4 of 325 μm and a core diameter of 4.5 μm.

FIG. 5 shows a cross section through the Te double-clad fiber produced. In this case, the cross section has been etched, so that the transitions from core to first cladding or second cladding are more clearly shown.

Example 4

The glass compositions shown in Table 2 were used to produce a double-clad fiber. In this case, first of all a preform comprising core and first cladding was produced using a double crucible. Then, this preform was provided with the second cladding by means of the rod-in-tube process. Next, the preform obtained was drawn out to form a glass fiber with a diameter of 125 μm.

TABLE 2

|  | Core | First cladding | Second cladding |
| --- | --- | --- | --- |
| $SiO_2$ [mol %] | 14.3 | 18.3 | 17.1 |
| $B_2O_3$ [mol %] | 28.5 | 26.5 | 26.5 |
| $Bi_2O_3$ [mol %] | 42.6 | 41.0 | 42.0 |
| $Al_2O_3$ [mol %] | 10.6 | 10.6 | 10.6 |
| $GeO_2$ [mol %] | 3.6 | 3.6 | 3.6 |
| $Er_2O_3$ [mol %] | 0.4 | — | — |
| CoO [mol %] | — | — | 0.2 |
| $n_{1300}{}^{1)}$ | 1.982 | 1.964 | 1.978 |

Example 5

The glass compositions shown in Table 3 were used to produce a double-clad fiber. In this case, first of all a preform comprising core and first cladding was produced using a double crucible. Then, this preform was provided with the second cladding by means of the rod-in-tube process. Next, the preform obtained was drawn out to form a glass fiber with a diameter of 125 μm.

TABLE 3

|  | Core | First cladding | Second cladding |
| --- | --- | --- | --- |
| $Bi_2O_3$ [mol %] | 40.5 | 39.3 | 40.1 |
| $B_2O_3$ [mol %] | 30.5 | 28.5 | 28.4 |
| $SiO_2$ [mol %] | 10.3 | 13.9 | 13.0 |
| $GeO_2$ [mol %] | 7.6 | 7.6 | 7.6 |
| $Al_2O_3$ [mol %] | 10.6 | 10.6 | 10.6 |
| $La_2O_3$ [mol %] | 0.1 | 0.1 | 0.1 |
| $Er_2O_3$ [mol %] | 0.4 | — | — |
| CoO [mol %] | — | — | 0.2 |
| $n_{1300}{}^{1)}$ | 1.973 | 1.959 | 1.969 |

The invention claimed is:

1. A glass fiber, comprising a core and at least two glass claddings surrounding said core, in which said core comprises a matrix glass, the matrix glass contains at least one heavy metal oxide and at least one rare earth compound, the matrix glass has a refractive index of greater than about 1.85, a refractive index change Δn from a first of the at least two glass claddings to the core is in a range from 0.001 to 0.08, the refractive index of the first glass cladding is lower than that of the core, the first glass cladding contains said at least one rare earth compound, and an outermost cladding of the at least two glass claddings contains from 5 to 5000 ppm of at least one absorbent component;

in which said at least one absorbent component is at least one transition metal compound;

in which the at least one heavy metal oxide is at least one oxide of Bi, Te, Se, Sb, Pb, Cd, Ga and/or As, or a mixture thereof; and in which said matrix glass contains an amount of each of said at least one rare earth compound equal to 0.05 to 5 mol %, but the first glass cladding contains only up to one half of said amount of each of said at least one rare earth compound in said matrix glass.

2. The glass fiber as claimed in claim 1, in which the core comprises at least $Bi_2O_3$ and/or $TeO_2$ and/or $Sb_2O_3$.

3. The glass fiber as claimed in claim 1, wherein the at least one rare earth compound contains at least one element selected from the group consisting of Ge, La, Pr, Nd, Pm, Sm, Eu, Gd, Tb, Dy, Ho, Er, Tm, Yb and Lu, or a mixture thereof.

4. The glass fiber as claimed in claim 1, in which the refractive index $n_{m2}$ of a second of the at least two glass claddings is higher than the refractive index $n_{m1}$ of the first cladding.

5. The glass fiber as claimed in claim 1, in which the refractive index $n_{m2}$ of a second of the at least two glass claddings is lower than the refractive index $n_{m1}$ of the first cladding.

6. The glass fiber as claimed in claim 1, in which the core is surrounded by two or three glass claddings.

7. The glass fiber as claimed in claim 1, in which the core has a diameter of from 1 to 15 μm.

8. The glass fiber as claimed in claim 1, in which the first cladding has a thickness $d_{m1}$ in a range from 5 to 100 μm.

9. The glass fiber as claimed in claim 4, in which the second cladding and/or a further cladding has a thickness ($d_{m2}$) in a range from 10 to 300 μm.

10. The glass fiber as claimed in claim 1, having a total thickness of 125 μm.

11. An optical amplifier comprising at least one glass fiber as claimed in claim 1.

12. A laser component comprising a glass fiber as claimed in claim 1.

13. The glass fiber as defined in claim 1, in which said at least one rare earth compound is $Er_2O_3$.

14. The glass fiber as defined in claim 1, in which said at least one absorbent compound contain $Co^{+2}$ ions.

15. The glass fiber as defined in claim 1, wherein said matrix glass consists of, in mol % on an oxide basis, $Bi_2O_3$, 30-60; $SiO_2$, 0.5-40; $B_2O_3$, 0.5-40; $Al_2O_3$, 0-30; $Ga_2O_3$, 0-20; $GeO_2$, 0-25; $La_2O_3$, 0-15; $Nb_2O_5$, 0-10; $SnO_2$, 0-30; $M^1{}_2O$, 0-40; and said at least one rare earth compound, 0.05-8, wherein $M^1$ is Li, Na, K, Rb, and/or Cs.

* * * * *